(12) United States Patent
Thomason

(10) Patent No.: US 6,559,832 B2
(45) Date of Patent: May 6, 2003

(54) MOUSE

(75) Inventor: Graham G. Thomason, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 167 days.

(21) Appl. No.: 09/761,248

(22) Filed: Jan. 16, 2001

(65) Prior Publication Data
US 2001/0024191 A1 Sep. 27, 2001

(30) Foreign Application Priority Data

Jan. 27, 2000 (GB) .............................. 0001776

(51) Int. Cl.$^7$ ................................ G09G 5/08
(52) U.S. Cl. ................ 345/163; 345/156; 345/159
(58) Field of Search ................ 345/163, 164, 345/156, 157; 74/471 XY

(56) References Cited

U.S. PATENT DOCUMENTS

| 4,613,853 | A | * | 9/1986 | Hosogoe et al. | ............. | 345/164 |
| 4,635,496 | A | * | 1/1987 | McTyre | ................. | 74/471 XY |
| 5,280,276 | A | | 1/1994 | Kwok | ......................... | 345/167 |
| 5,287,090 | A | | 2/1994 | Grant | ......................... | 345/163 |
| 5,457,479 | A | | 10/1995 | Cheng | ......................... | 345/163 |
| 5,648,798 | A | | 7/1997 | Hamling | ..................... | 345/163 |
| 5,898,424 | A | * | 4/1999 | Flannery | ..................... | 345/163 |
| 5,936,612 | A | | 8/1999 | Wang | ......................... | 345/164 |
| 6,184,869 | B1 | * | 2/2001 | Harding et al. | ............. | 345/163 |

FOREIGN PATENT DOCUMENTS

| DE | 4211189 A1 | 10/1993 | ........... G06F/3/033 |
| EP | 0166432 | 6/1985 | ........... G06K/11/06 |

OTHER PUBLICATIONS

"Auto Double–Click Generator for KIOSK Personal Computer", IBM Technical Disclosure Bulletin, vol. 40, No. 08, Aug. 1997.

"Computer Communication Method", Patent Abstracts of Japan, Publication No. 08211996A, Dated Aug. 20, 1996.

"Mouse", Patent Abstracts of Japan, Publication No. 07230355A, dated Aug. 29, 1995.

"Coordinate Input Device", Japanese Abstract 5–19961, dated Jan. 29, 1993.

"Input Device", Japanese Abstract 2–77826, dated Mar. 16, 1990.

Coordinate Input Device, Japanese Abstract 63–318624, dated Dec. 27, 1988.

* cited by examiner

Primary Examiner—Steven Saras
Assistant Examiner—Fritz Alphonse

(57) ABSTRACT

A mouse (20) comprises first (24) and second (28) projections on the bottom surface of the mouse housing. The second projections (28) only come into contact with the mouse mat on application of pressure by the user, so as to assist in holding the mouse still, for example during double clicking operations.

7 Claims, 1 Drawing Sheet

MOUSE

The present invention relates to a mouse for use with a computer-based system.

A conventional mouse comprises a housing for a tracker ball, having buttons on the top surface of the housing and a number of projections on the bottom surface of the housing for providing a small contact area with a mouse mat or other surface on which the mouse is to be operated. The projections enable the mouse to move, as the friction between the projections and the mouse mat is low. The friction between the tracker ball and the mat is sufficient to make the tracker ball roll and thereby operate the computer-based system as the mouse is moved.

The buttons on the top surface may typically be operated in a number of ways to perform desired commands. Thus, single clicks and double clicks may be recognised, where a double click is identified as a two single clicks with a sufficiently rapid repetition rate and with no movement between those clicks. Movement of the mouse when a button is held down is typically identified as a drag command.

Some users, for example beginner users and the elderly, may have difficulty in making a clean single click or double-click when using a mouse. They may move the mouse slightly whilst attempting to double click and their action is then interpreted as a drag operation. Similarly, a single click operation with the button held down for a long time may also be interpreted as a drag operation if there is mouse movement.

According to the invention, there is provided a computer mouse comprising a housing containing a ball, first support projections from the bottom surface of housing which lie in a contact plane for contact with the surface on which the mouse is to be operated and at least one button on a top portion of the housing, the mouse further comprising at least one second projection which extends at least a portion of the bottom surface of the housing to a level close to be above the contact plane.

The positioning of the second projection is such that it comes into contact with the surface on which the mouse is to be operated on application of pressure by the user. This increases the friction to reduce unintentional movement during a double clicking operation. The exerted pressure is the automatic result of applying the downward force on the buttons on the top portion of the housing. Of course, the user may intentionally apply extra vertical pressure to prevent the mouse from moving during operation of the switch or switches.

The second projection may make contact with a mouse mat when vertical pressure is applied by the user, as a result of the compressibility of the mouse mat.

Preferably, there is greater sliding friction between the second projection or projections and the surface on which the mouse is to be operated than between the first projections and the surface on which the mouse is to be operated.

A preferred embodiment of the invention has at least two second projections, which together define a second contact plane. Alternatively, a second projection may be of a size to extend across substantially the whole of the bottom surface of the housing.

The mouse may comprise a further button or buttons, the operation of which is insensitive to mouse movement. In this way, any mouse movement during single or double click operations may be ignored so as to avoid inadvertent dragging actions. A mouse may be provided with as many further buttons as are required to distinguish separate operations in the system.

An example of the present invention will now be described in detail with reference to the accompanying drawings in which.

Figure 1:
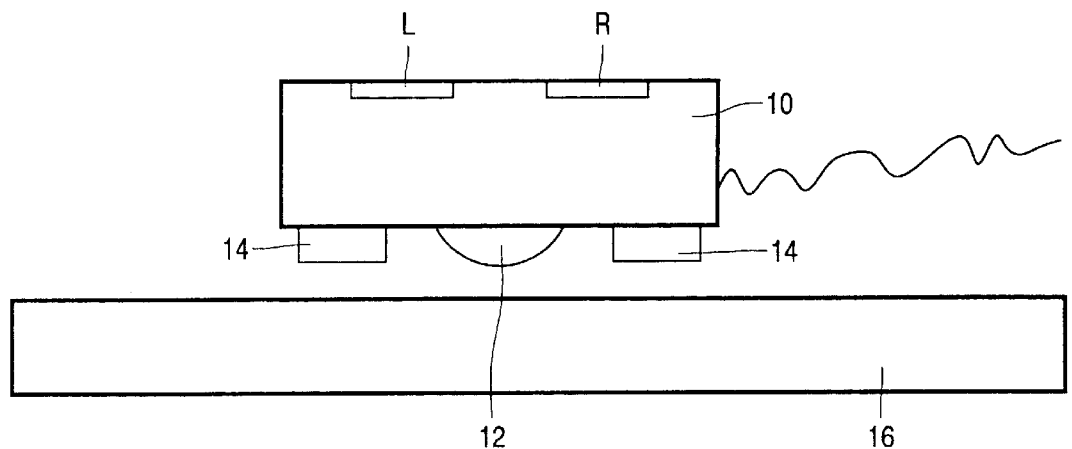
FIG. 1 shows a conventional computer system mouse.

FIG. 1 shows a mouse 10 with a tracker ball 12 and projections 14 which define a contact plane to make sliding contact with a mouse mat 16 or other surface on which the mouse is to be operated. The projections are of a material which has a low coefficient of friction with a mouse mat, to enable smooth movement of the mouse on the mouse mat. For example, the projections may be formed of a plastics material, and may indeed be moulded integrally with the main housing of the mouse.

There may for example be two parallel projections, as represented in FIG. 1, although any other number or arrangement is possible which provides a reduced area of contact between the mouse and the mat.

A conventional mouse typically has two push buttons, which are spring biased so that they return automatically to an upward position after being pressed. These are shown schematically as L and R (left and right) in FIG. 1.

Figure 2:
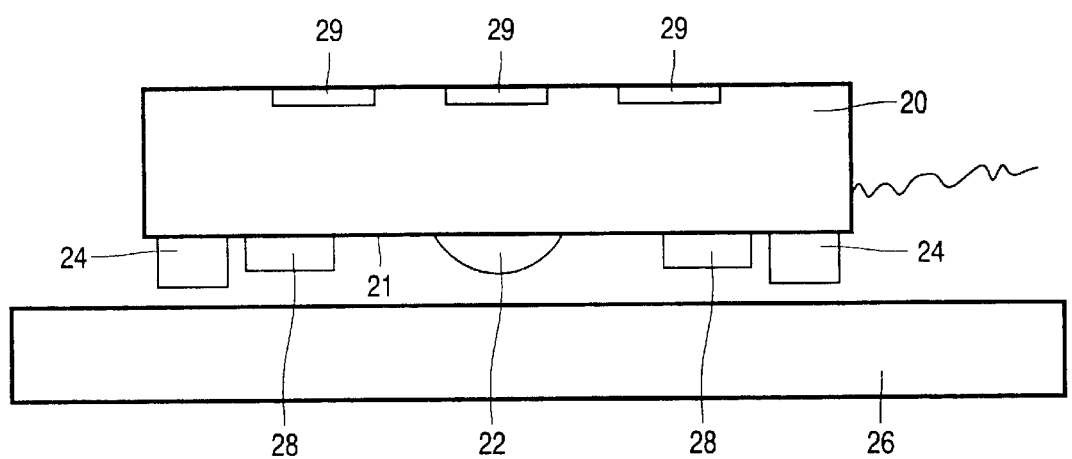
FIG. 2 shows a mouse according to a preferred embodiment of the present invention.

FIG. 2 shows an embodiment according to the present invention. Again, the mouse 20 comprises a tracker ball 22 and projections 24 defining a contact surface for contact with the mouse mat 26. The mouse 20 is also provided with second projections 28, which extend below the bottom surface 21 of the mouse housing (or which are extensions of the bottom surface of the housing) to a level between the bottom surface 21 of the housing and the contact plane defined by the first projections 24. Thus, the second projections 28 define a second contact plane, which only makes contact with the mouse mat (or other surface) when a downward pressure is applied to the mouse by the user.

The mouse has a number of buttons 29 on the top surface.

This downward pressure may either result in deformation of the mouse mat, so that the second projections come into contact with the mat, or else it may result in deformation of the first projections 24. In the latter case, the first projections would need to be formed of a compressible material, or else they would need to be movably mounted to the mouse housing, for example by a sprung arrangement.

The second projections may be formed from a material having a higher coefficient of friction with the intended surface on which the mouse is to be operated than the first projections. For example, the second projections may be formed from a rubber composition. This provides that when the second projections come into contact with the mouse mat, there is greatly increased resistance to movement of the mouse. Alternatively, or additionally, the second projections may have much greater area than the first projections, again so as to increase the resistance to movement. For example, the second projection may comprise a single pad, covering a significant area of the underside of the mouse, up to and including substantially the whole of the bottom surface of the housing.

In this way, a double-click or single-click action may be performed easily, and the risk of unwillingly performing a drag movement is reduced.

The buttons 29 on the top surface of the mouse may be the conventional left and right buttons, the left button typically being assigned to selection or dragging operations and the right button typically being assigned to menu selecting operations. A user-definable middle button is also known in the art.

However, there may also be provided additional buttons (not specifically shown) to simplify further the operation of the mouse. These additional buttons may recognise button clicks but ignore mouse movement. This eliminates the possibility of a click or double click being interpreted as a drag command.

Also, these buttons may be programmed to accept a longer time constant for the limit of a single click than is normally the case. The time constant may be programmable by the user.

A prolonged application of a button (longer than the time constant) may be interpreted as a double click, or else a specific button may be defined to perform the double-click function.

Various other known mouse functions may be applied to the mouse of the invention. For example, the mouse may be wired (as schematically represented in the drawings) or wireless. The mouse may also be provided with thumbwheels as well as buttons.

What is claimed is:

1. A computer mouse comprising a housing containing a ball, first support projections from the bottom surface of housing which lie in a contact plane for contact with the surface on which the mouse is to be operated and at least one button on a top portion of the housing, the mouse further comprising at least one second projection which extends at least a portion of the bottom surface of the housing to make a resistive contact with the contact plane when a downward pressure is applied to the mouse.

2. A mouse as claimed in claim 1, comprising at least two second projections defining a second contact plane.

3. A mouse as claimed in claim 1, wherein there is greater sliding friction between the second projection or projections and the surface on which the mouse is to be operated than between the first projections and the surface on which the mouse is to be operated.

4. A mouse as claimed in claim 1, further comprising a further button or buttons the operation of which is insensitive to mouse movement.

5. A mouse as claimed in claim 1, wherein said at least one second projection extends across substantially the whole of the bottom surface of the housing.

6. A mouse as claimed in claim 1, wherein the second projections comprise a substantially greater contact area than the first support projections.

7. A mouse as claimed in claim 1, wherein the second projection is formed from a rubber composition.

\* \* \* \* \*